(12) United States Patent
Khan et al.

(10) Patent No.: US 10,859,114 B2
(45) Date of Patent: Dec. 8, 2020

(54) UNIVERSAL JOINT BEARING

(71) Applicant: Aktiebolaget SKF, Gothenburg (SE)

(72) Inventors: Suhel Ahamad Khan, Jabalpur (IN);
Helmut Hauck, Euerbach (DE);
Hubert Herbst, Gaedheim (DE)

(73) Assignee: Aktiebolaget SKF, Gothenburg (SE)

( * ) Notice: Subject to any disclaimer, the term of this patent is extended or adjusted under 35 U.S.C. 154(b) by 319 days.

(21) Appl. No.: 15/883,521

(22) Filed: Jan. 30, 2018

(65) Prior Publication Data

US 2018/0223900 A1    Aug. 9, 2018

(30) Foreign Application Priority Data

Feb. 9, 2017   (IN) .............................. 201741004656

(51) Int. Cl.
| | | |
|---|---|---|
| *F16C 21/00* | (2006.01) | |
| *F16C 19/55* | (2006.01) | |
| *F16C 33/78* | (2006.01) | |
| *F16J 15/3276* | (2016.01) | |
| *F16D 3/38* | (2006.01) | |
| *F16C 19/46* | (2006.01) | |

(52) U.S. Cl.
CPC ............ *F16C 19/55* (2013.01); *F16C 21/005* (2013.01); *F16C 33/7809* (2013.01); *F16C 33/7886* (2013.01); *F16C 33/7889* (2013.01); *F16D 3/385* (2013.01); *F16J 15/3276* (2013.01); *F16C 19/466* (2013.01); *F16D 2300/08* (2013.01)

(58) Field of Classification Search
USPC .......................................................... 464/131
See application file for complete search history.

(56) References Cited

U.S. PATENT DOCUMENTS

| | | | | |
|---|---|---|---|---|
| 2,773,366 A | * | 12/1956 | Slaght ................. | F16C 33/7809 464/131 |
| 3,479,840 A | * | 11/1969 | Meyers .................. | F16D 3/385 464/131 |
| 4,512,672 A | | 4/1985 | Olschewski .......... | F16C 21/005 277/402 |
| 4,576,382 A | | 3/1986 | Scharting ............ | F16C 33/7809 277/353 |
| 4,645,474 A | | 2/1987 | Olschewski .......... | F16C 21/005 277/402 |
| 4,806,026 A | | 2/1989 | Bauer ................. | F16C 33/7809 277/353 |
| 5,026,324 A | | 6/1991 | Schurger ............. | F16C 33/7809 277/551 |
| 5,597,356 A | * | 1/1997 | Rieder ................. | F16C 21/005 464/131 |

(Continued)

FOREIGN PATENT DOCUMENTS

| | | |
|---|---|---|
| CN | 100588850 C | 2/2010 |
| CN | 102200172 A | 9/2011 |

(Continued)

*Primary Examiner* — Greg Binda
(74) *Attorney, Agent, or Firm* — Garcia-Zamor Intellectual Property Law; Ruy Garcia-Zamor; Bryan Peckjian

(57) ABSTRACT

A universal joint bearing having a cup that serves as an outer ring of the universal joint bearing. The universal joint bearing includes exactly one sealing ring that is provided for sealing a gap between the cup and a trunnion.

20 Claims, 7 Drawing Sheets

(56) References Cited

U.S. PATENT DOCUMENTS

| | | | | |
|---|---|---|---|---|
| 5,626,520 A * | 5/1997 | Mazziotti | ............ | F16C 33/7809 |
| | | | | 464/131 |
| 5,769,723 A | 6/1998 | Faulbecker | ......... | F16C 33/7809 |
| | | | | 277/300 |
| 6,050,571 A | 4/2000 | Rieder | ................. | F16C 21/005 |
| | | | | 277/353 |
| 6,183,369 B1 | 2/2001 | Faulbecker | ............ | F16D 3/385 |
| | | | | 277/352 |
| 6,357,754 B1 * | 3/2002 | Rieder | ................. | F16C 21/005 |
| 7,258,490 B2 | 8/2007 | Peschke | ............... | F16C 21/005 |
| | | | | 384/485 |
| 7,465,100 B2 * | 12/2008 | Matsui | ............... | F16C 33/7809 |
| | | | | 464/131 |
| 8,939,844 B2 | 1/2015 | Higuchi | ................. | F16D 3/385 |
| | | | | 277/321 |
| 9,816,566 B2 * | 11/2017 | Hess | ................... | F16C 33/7809 |
| 10,570,965 B2 * | 2/2020 | Khan | ............... | F16C 33/7826 |
| 2004/0224779 A1 | 11/2004 | Menosky | ............. | F16C 21/005 |
| | | | | 464/178 |

FOREIGN PATENT DOCUMENTS

| | | | | |
|---|---|---|---|---|
| CN | 105317847 A | 2/2016 | | |
| DE | 4128179 A1 | 2/1993 | | |
| DE | 4128179 A1 | 2/1993 | ............ | F16C 21/005 |
| DE | 19701461 A1 | 7/1998 | | |
| DE | 19701461 A1 | 7/1998 | ............ | F16C 21/005 |
| DE | 102014215000 A1 | 2/2016 | | |
| JP | 08100820 A | 4/1996 | | |
| JP | H08100820 A | 4/1996 | | |
| JP | 09151956 A | 6/1997 | .............. | F16D 3/41 |
| JP | H09151956 A | 6/1997 | | |

\* cited by examiner

UNIVERSAL JOINT BEARING

CROSS-REFERENCE

This application claims priority to Indian patent application no. 201741004656 filed on Feb. 9, 2017, the contents of which are fully incorporated herein by reference.

TECHNOLOGICAL FIELD

The invention concerns an universal joint bearing.

BACKGROUND

An universal joint bearing arrangement comprising one trunnion and one cup is known, wherein the cup serves as an outer ring of the universal joint bearing. In particular CN105317847A and CN100588850C disclose sealings for such situations.

SUMMARY

The object of the invention is, in particular, to provide a universal joint bearing according to the invention which is very efficient.

The invention starts from an universal joint bearing comprising one cup, which serves as an outer ring of the universal joint bearing.

It is suggested that the universal joint bearing comprises exactly one sealing ring, which is provided for sealing a gap between the cup and a trunnion. A "universal joint bearing" is in particular a part of a universal joint which comprises at least a cup and rolling elements, but which comprises no trunnion. According to the invention a very efficient universal joint bearing is achieved. In particular a very effective and cost efficient sealing of the universal joint bearing is accomplished. Furthermore, in particular a protection of the universal joint bearing from heavy mud and dust under extreme conditions is achieved.

Further advantages result from the following drawing description. Embodiments of the invention are shown in the drawings. The drawings, the description and the claims contain numerous features in combination. The person skilled in the art will expediently also consider the features individually and combine them into meaningful further combinations.

DETAILED DESCRIPTION

Figure 1:
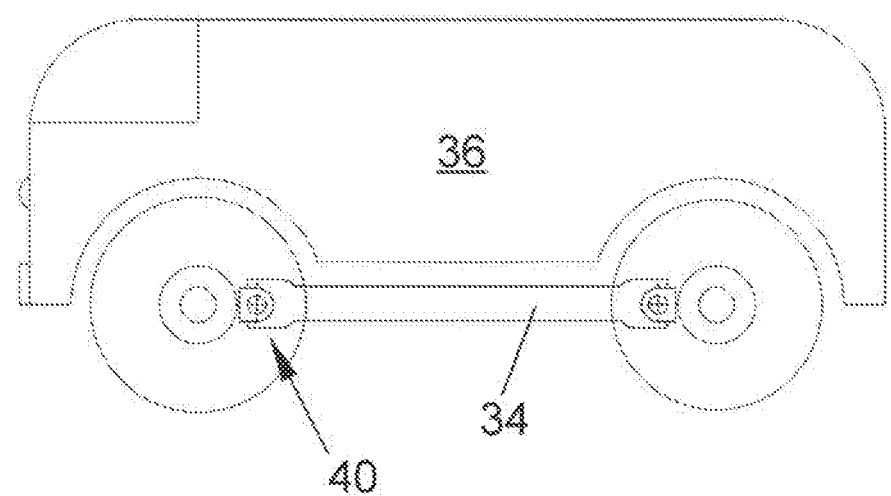
FIG. 1 shows a motor vehicle comprising a universal joint with an universal joint bearing according to the invention.
Figure 2:
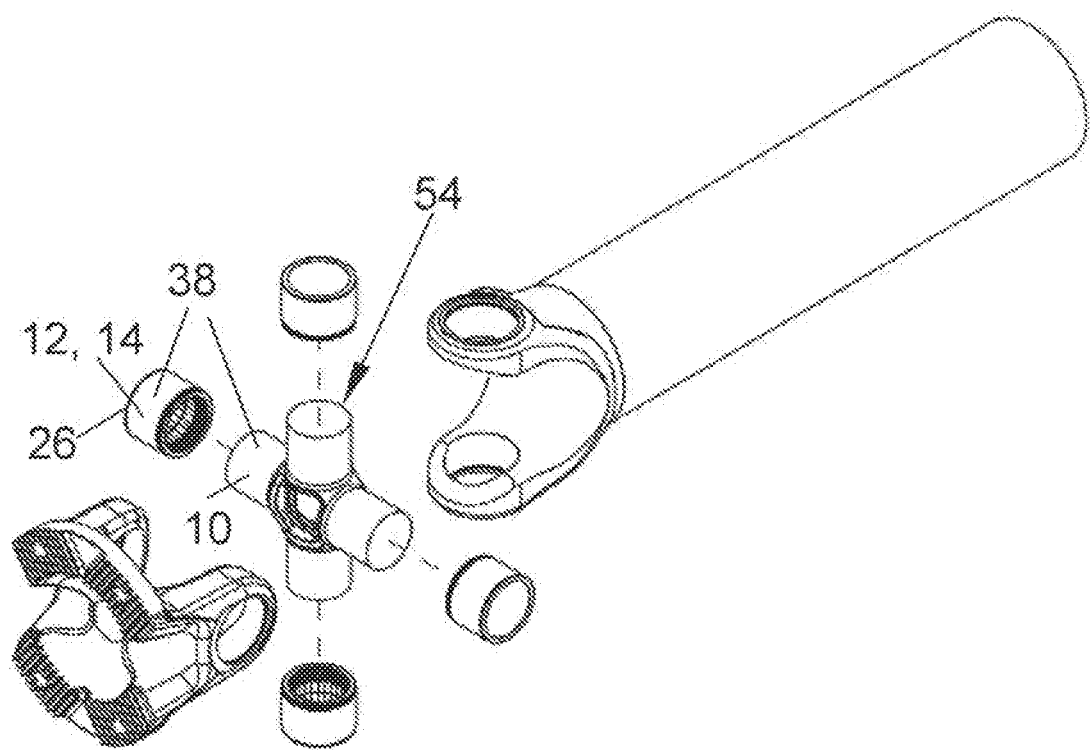
FIG. 2 shows the universal joint in an explosion view.
Figure 3:
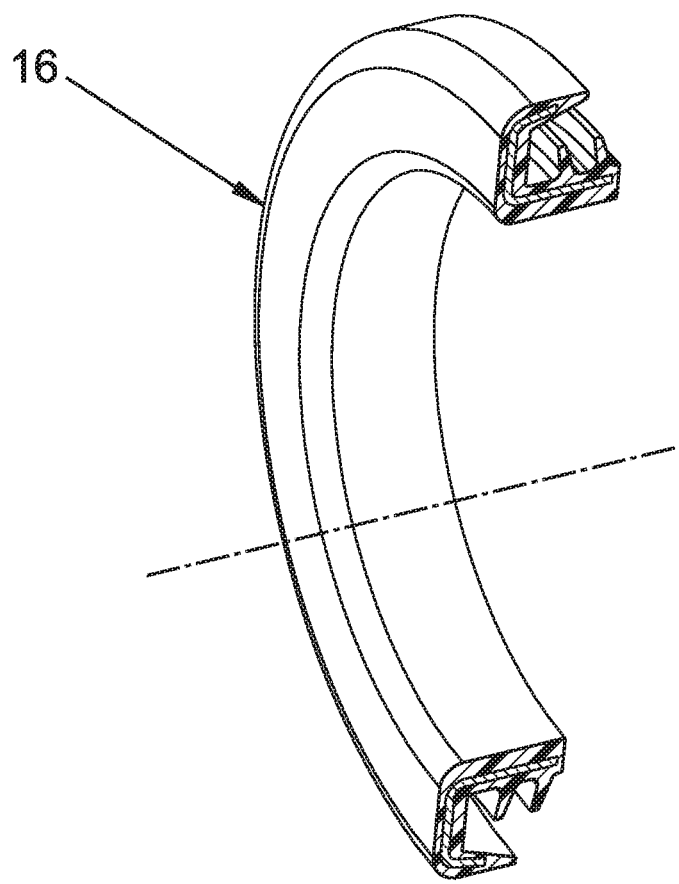
FIG. 3 shows a section through a sealing ring of the universal joint bearing.
Figure 4:
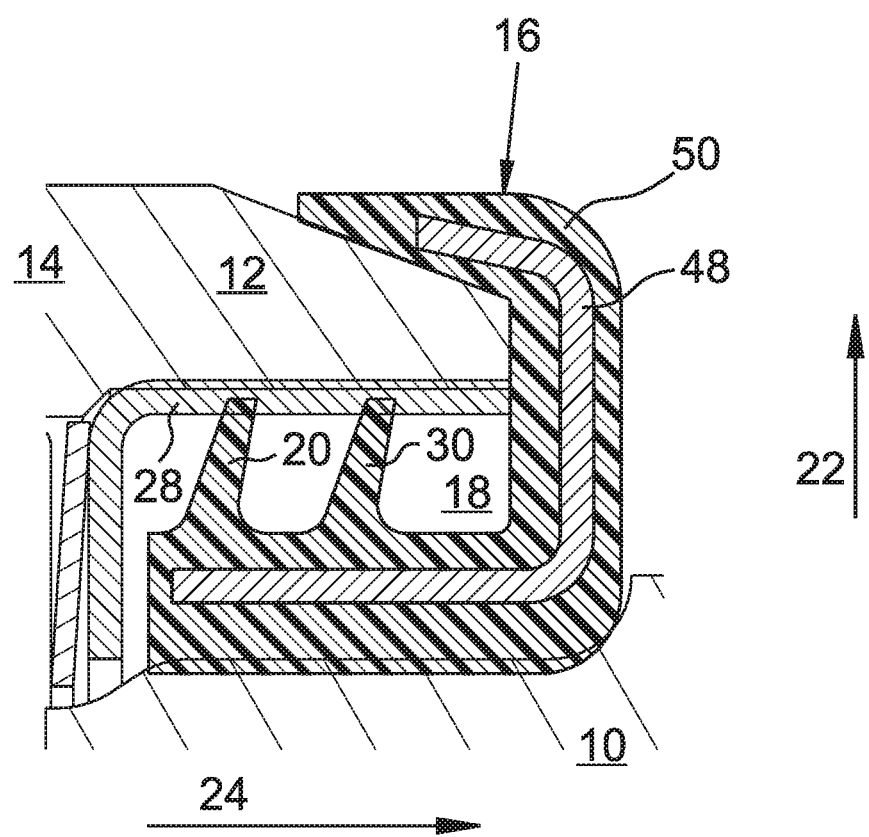
FIG. 4 shows a part of a section through the universal joint bearing and a trunnion.
Figure 5:
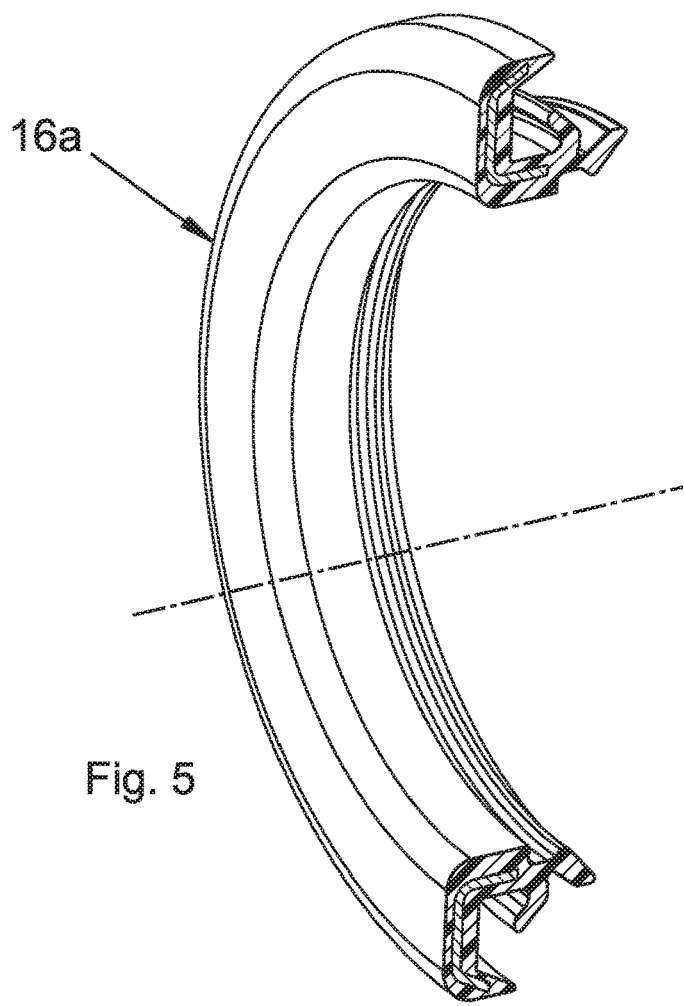
FIG. 5 shows a section through a sealing ring of a second universal joint bearing according to the invention, which comprises an axial sealing lip.
Figure 6:
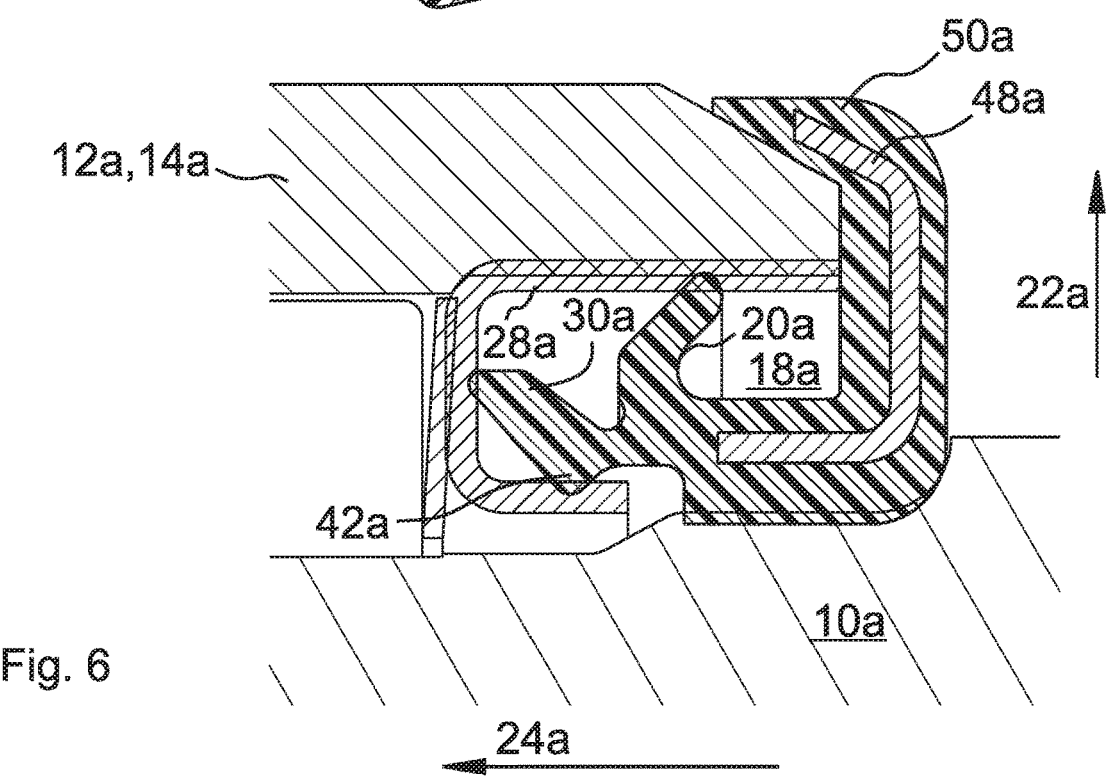
FIG. 6 shows a part of a section through the second universal joint bearing and a trunnion.
Figure 7:
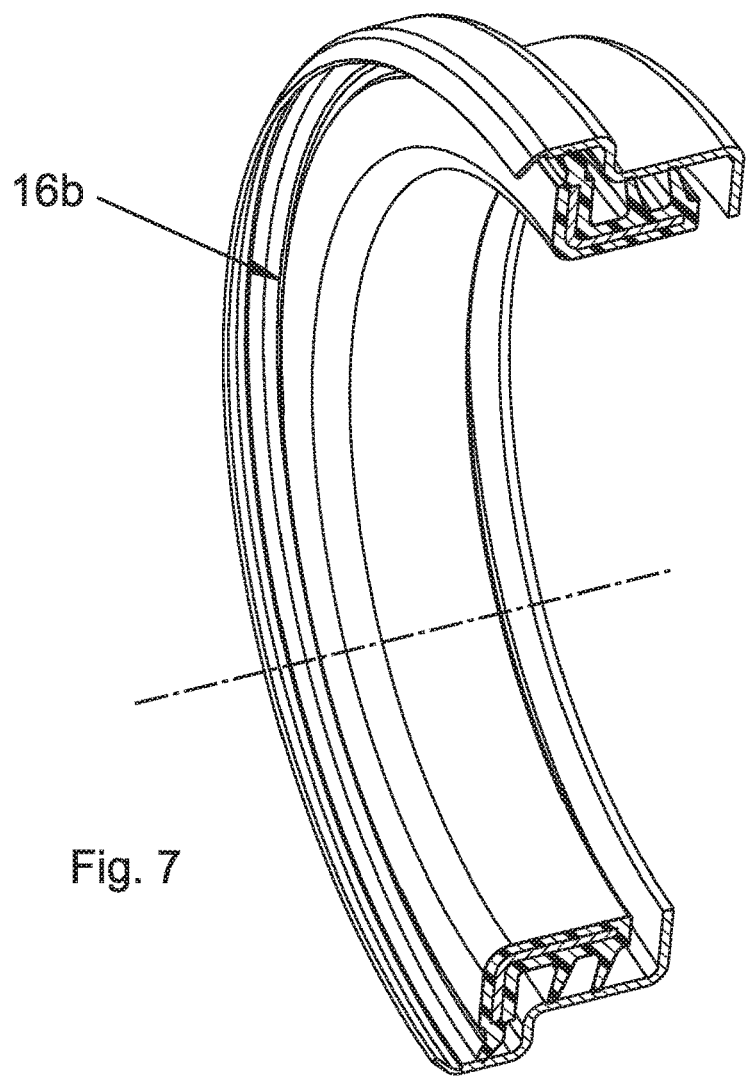
FIG. 7 shows a section through a sealing ring and a metal ring of a third universal joint bearing according to the invention.
Figure 8:
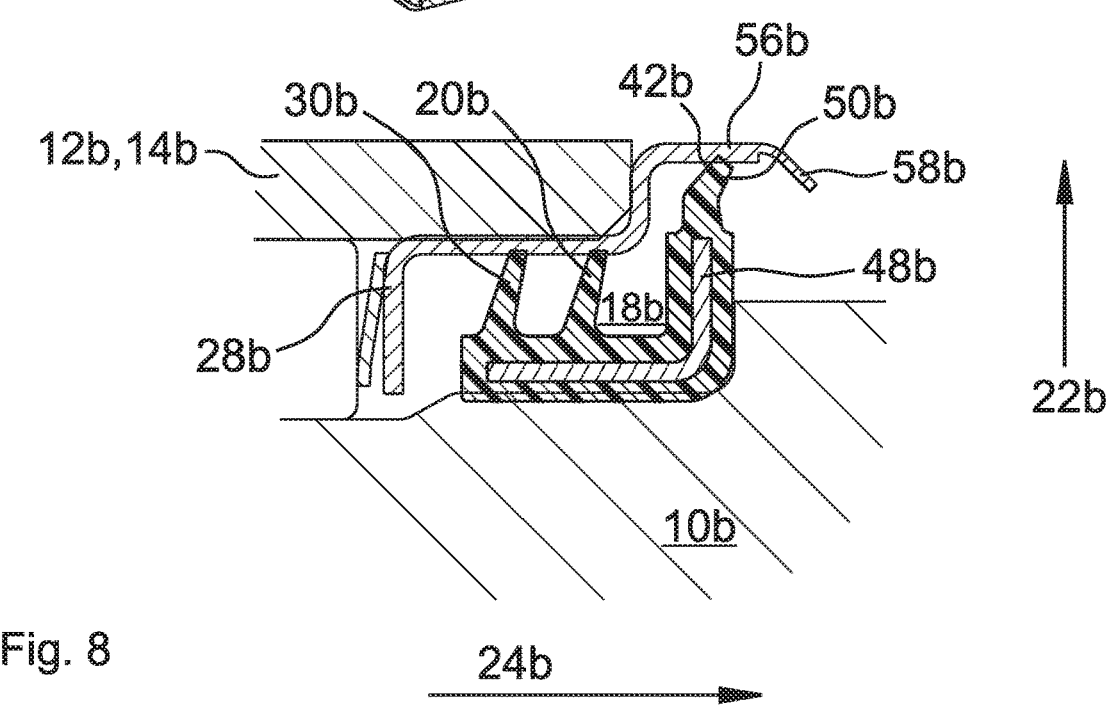
FIG. 8 shows a part of a section through the third universal joint bearing and a trunnion.
Figure 9:
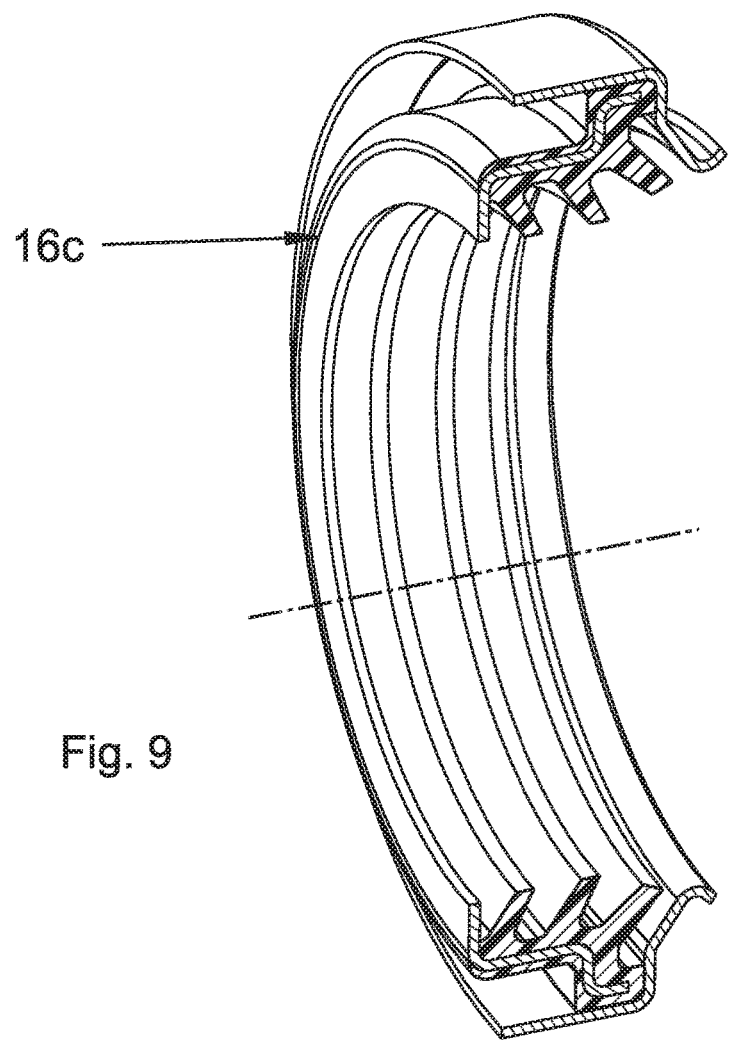
FIG. 9 shows a section through a sealing ring and a metal ring of a fourth universal joint bearing according to the invention, wherein the metal ring is at a radially outer position.
Figure 10:
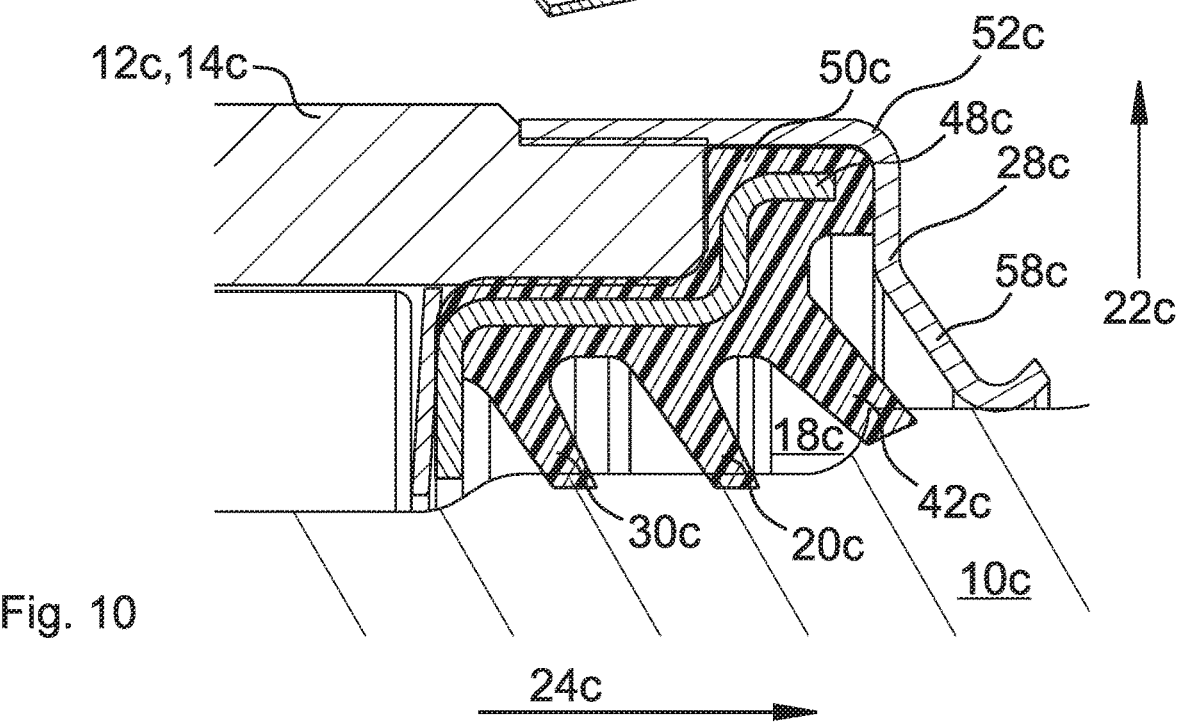
FIG. 10 shows a part of a section through the fourth universal joint bearing and a trunnion.
Figure 11:
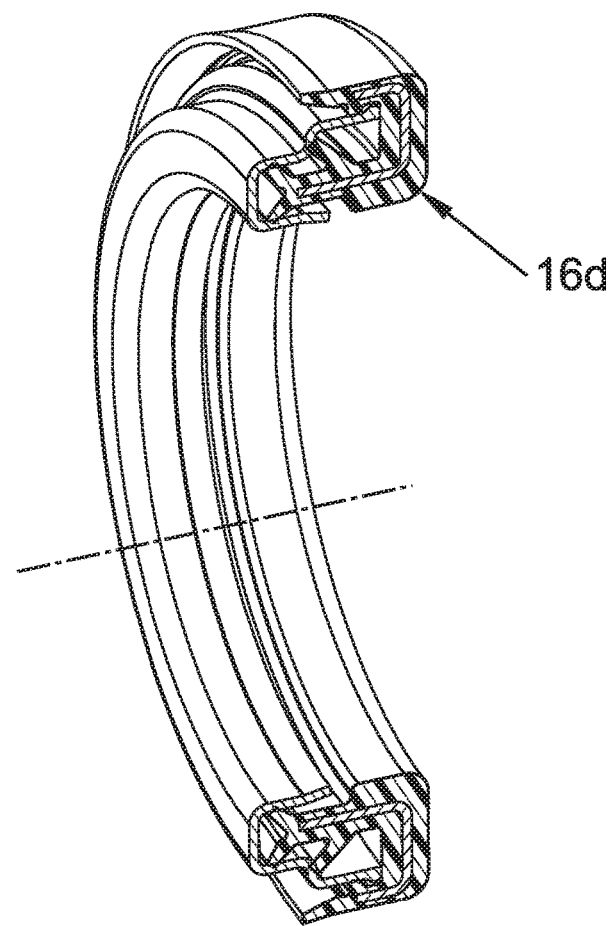
FIG. 11 shows a section through a sealing ring and a metal ring of a fifth universal joint bearing according to the invention, wherein the sealing ring comprises four sealing lips.
Figure 12:
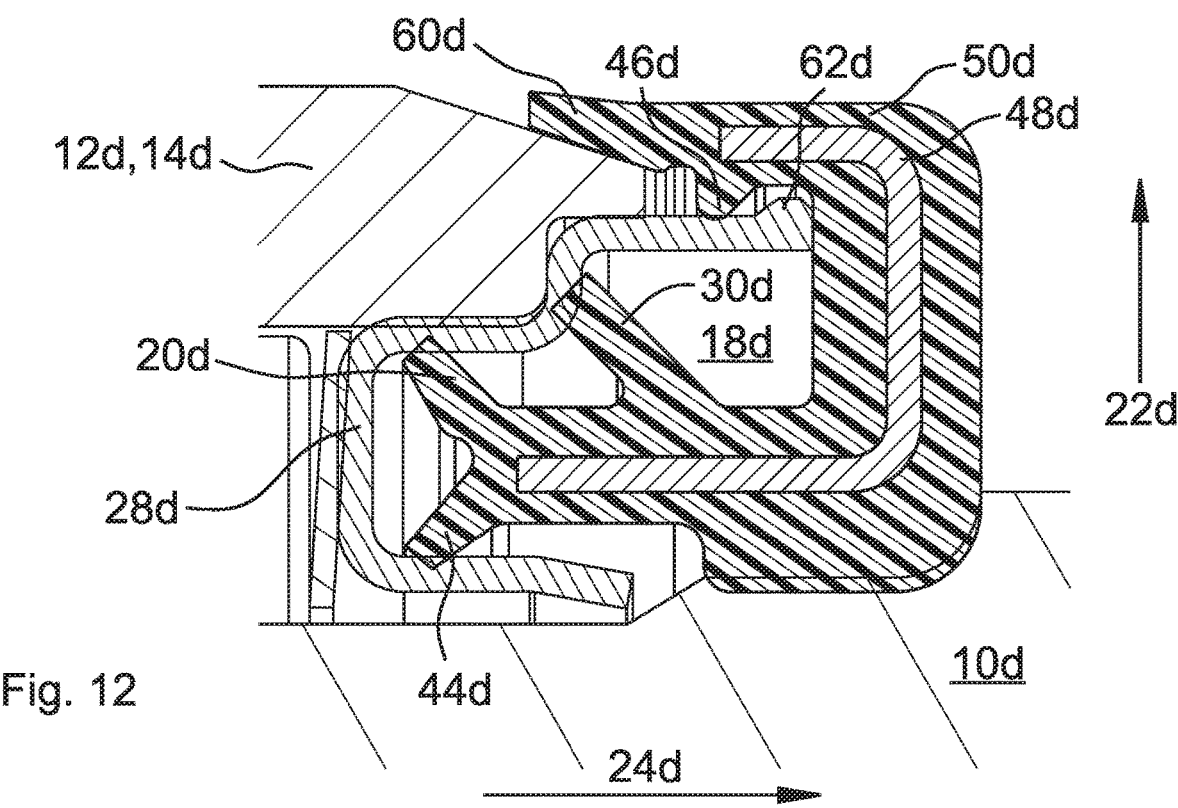
FIG. 12 shows a part of a section through the fifth universal joint bearing and a trunnion.

FIG. 1 shows a motor vehicle 36 comprising a universal joint 40 with an universal joint bearing arrangement. The universal joint bearing arrangement possess a universal joint bearing 38 according to the invention and a crosspiece 54 of the universal joint (FIGS. 2 to 4). The motor vehicle is a truck. The universal joint is connected to a propeller shaft 34 of the truck. A trunnion 10 of the crosspiece serves as an inner ring for the universal joint bearing. Furthermore, the universal joint bearing comprises a cup 12, which serves as an outer ring 14 of the universal joint bearing. The universal joint bearing has exactly one sealing ring 16, which seals a gap 18 between the cup and the trunnion. The sealing ring consists of a reinforcement ring 48 and an elastomeric ring 50. It is force-fitly fixed to the trunnion. The reinforcement ring is preferably made out of a metallic material but non-metallic materials as well as combinations of both are optional solutions. The elastomeric ring is preferably made out of non-metallic materials like rubber or thermoplastic elastomers. Metallic materials like sinter materials or combinations of metallic and non-metallic materials are optional solutions as well.

Moreover, the universal joint bearing possesses a metal ring 28 which is directly force-fitly fixed at the cup. The elastomeric ring comprises a first and a second sealing lip 20, 30 which extend mainly in a radial direction 22 with respect to the trunnion. The two sealing lips abut against the metal ring in a sealing way in order to seal the gap 18. Furthermore, the elastomeric ring is positioned by the reinforcement ring close towards a radial outer surface of the cup which also contributes to seal the gap 18. The two sealing lips 20, 30 are positioned behind each other along an axial direction 24 of the trunnion. They are protected from the out-side of the universal joint bearing by the reinforcement ring 48.

The universal joint bearing can be maintenance free or non maintenance free.

Alternative embodiments are shown in FIGS. 5 to 12. Essentially the same components, features and functions are always given the same reference numerals. However, in order to differentiate the exemplary embodiments, the letters "a", "b", etc. are added to the reference numerals of the exemplary embodiments in FIGS. 5 to 12. The following description is essentially limited to the differences from the exemplary embodiment in FIGS. 1 to 4, wherein references can be made to the description of the exemplary embodiment in FIGS. 1 to 4 with respect to the components, features and functions which remain the same.

In a first alternative embodiment (FIGS. 5 and 6) an elastomeric ring 50a comprises a sealing lip 30a which extends mainly in axial direction 24a with respect to the trunnion towards the bottom 26 of the cup. A third sealing lip 42a of the sealing ring points radially inwardly and abuts also against the metal ring 28a. The sealing ring comprises in total three sealing lips.

In a second alternative embodiment (FIGS. 7 and 8) the elastomeric ring has a third sealing lip 42b which mainly extends in the radial direction 22b relative to a trunnion 10b. The sealing lip 42b abuts against a cylindrical portion 56b of a metal ring 28b. The metal ring is force-fitly fixed to a cup 12b. Furthermore, the metal ring 28b comprises a shield portion 58b which adjoins the cylindrical portion. The shield portion has a shape of a part of a surface of a cone and is positioned farther away from the bottom of the cup than the cylindrical portion. In principle the shield portion can be oriented from 0° to 90° with respect to the cylindrical portion 56b. The shield portion protects the sealing ring in particular from heavy contamination, i.e. dust and harmful mechanical influences from the environment. In this example the shield portion is directly formed out of the metal ring. In other embodiments of the invention the shield portion is not formed integrally with the metal ring.

In a third alternative embodiment (FIGS. 9 and 10) the universal joint bearing comprises a metal ring 28c which possesses an area 52c which has a bigger distance to the center of gravity of the cup than all areas of the sealing ring. A portion of the metal ring surrounds the sealing ring radially outwardly and is fixed to a radial outer surface of the cup 12c. The sealing ring is fixed to the cup and comprises three sealing lips 20c, 30c, 42c, each inclined with an angle between 0° and 90° with respect to a radial direction 22c. All sealing lips of the sealing ring abut against the trunnion. The lips ensure a better protection of the bearing.

Moreover, the metal ring comprises an additional shield portion 58c directed towards the trunnion providing an additional protection. By this the sealing ring is protected from heavy mud and slurry particles from the environment.

In a fourth alternative embodiment (FIGS. 11 and 12) a sealing ring comprises four sealing lips 20d, 30d, 44d, 46d which abut against a metal ring 28d. Three of the sealing lips 20d, 30d, 44d extend equally in a axial direction 24d and in a radial direction 22d relative to a trunnion 10d. The sealing lip 46d extends radially inwardly and abuts against the metal ring at a radially outer surface of the metal ring. The metal ring 28d provides an undercut portion 62d that enables the ring to be preassembled with the sealing ring 16d. By this feature, the universal joint bearing 38, the metal ring and the sealing ring form a pre-assembled unit before this unit is mounted on the trunnion 10d of the crosspiece 54. The metal ring 28 can be alternatively made out of a non-metallic material or a combination of metallic and non-metallic materials. Optionally this ring can be one single part or an assembly of more than one part.

Furthermore, an elastomeric ring 50d of the sealing ring 16d comprises a portion 60d which touches a radial outer surface of a cup 14d of the alternative embodiment. Through this the portion 60d acts as a wiper in operating conditions and wipes dirt from the radial outer surface of the cup 14d.

Figure 13:
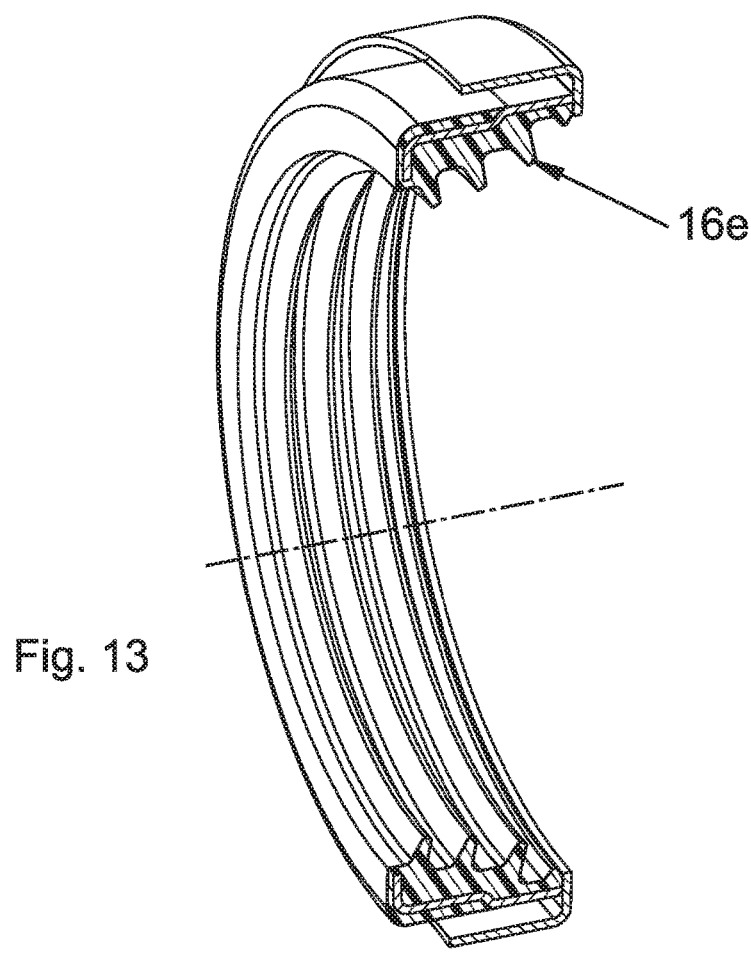
FIG. 13 shows a section through a sealing ring and a metal ring of a sixth universal joint bearing according to the invention.
Figure 14:
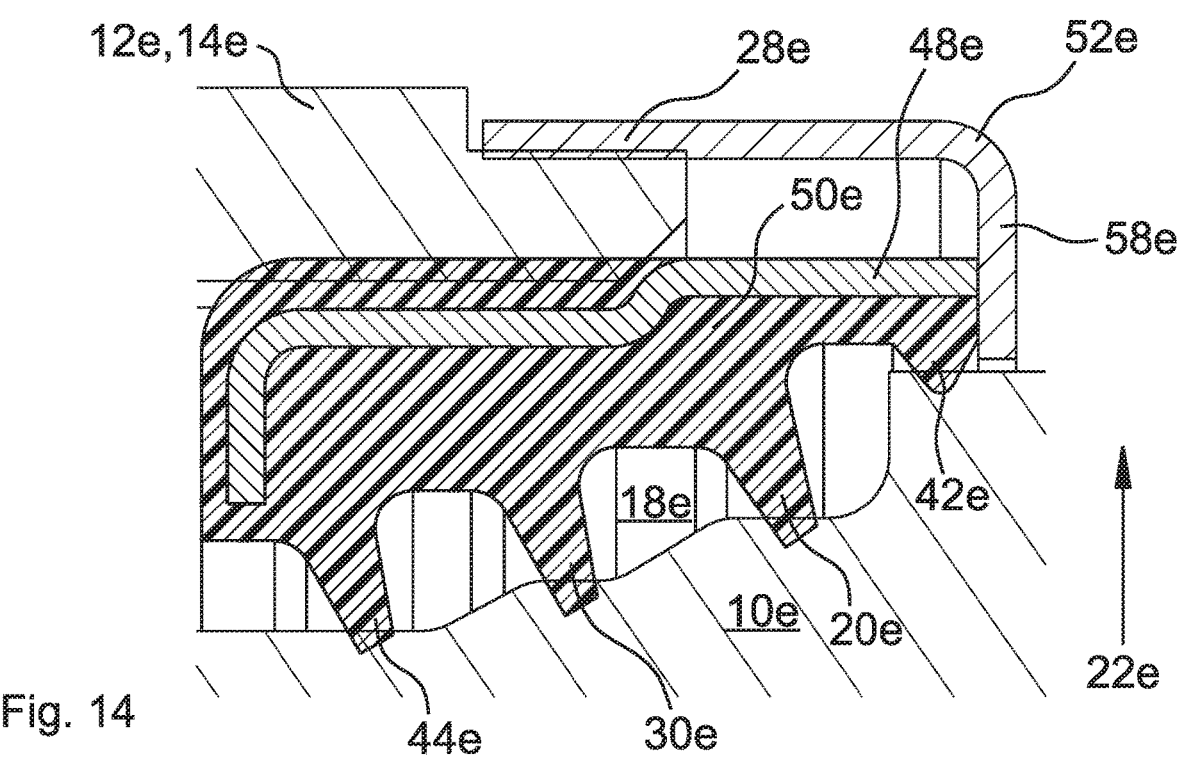
FIG. 14 shows a part of a section through the sixth universal joint bearing and a trunnion.

In a fifth alternative embodiment (FIGS. 13 and 14) the universal joint bearing comprises a metal ring 28e which possesses an area 52e which has a bigger distance to the center of gravity of the cup than all areas of the sealing ring 16e. A first portion of the metal ring surrounds the sealing ring radially outwardly and is fixed to a radial outer surface of the cup 12e. From the first portion a second portion of the metal ring projects radially inwardly. The first and the second portion protect the sealing ring from heavy dust and dirt. Therefore the sealing ring has a long operating life. The sealing ring is forcefitly fixed to the cup and comprises four sealing lips 20e, 30e, 42e, 44e. All sealing lips of the sealing ring abut against the trunnion. The lips ensure a better protection of the bearing. Because of its fixation to the cup and the protection by the metal ring the sealing ring provides a reliable sealing also under shock loads.

REFERENCE NUMERALS 10 trunnion
12 cup
14 outer ring
16 sealing ring
18 gap
20 sealing lip
22 radial direction
24 axial direction
26 bottom
28 metal ring
30 sealing lip
34 propeller shaft
36 motor vehicle
38 universal joint bearing
40 universal joint
42 sealing lip
44 sealing lip
46 sealing lip
48 reinforcement ring
50 elastomeric ring
52 area
54 crosspiece
56 cylindrical portion
58 shield portion
60 portion
62 undercut portion

What is claimed is:

1. A universal joint bearing comprising:
a cup that serves as an outer ring of the universal joint bearing,
exactly one sealing ring, which is provided for sealing a gap between the cup and a trunnion,
at least one metal ring,
wherein the sealing ring comprises a reinforcement ring and an elastomeric ring which prevents the reinforcement ring from abutting the outer ring,
wherein a first axially extending portion of the at least one metal ring lays over, is located adjacently to, and connects to an axially extending radial surface of the outer ring, which faces radially outwardly therefrom, such that the at least one metal ring is not interposed between any portion of the elastomeric ring and the at least one outer ring.

2. The universal joint bearing according to claim 1, wherein the elastomeric ring comprises at least one sealing lip that extends in a radial direction with respect to the trunnion and/or the cup.

3. The universal joint bearing according to claim 1, wherein the at least one metal ring provides at least one area, that has a larger distance to a center of gravity of the cup than all areas of the sealing ring.

4. The universal joint bearing according to claim 1, wherein the elastomeric ring comprises in total any one of the group of: three sealing lips, four sealing lips, and five sealing lips.

5. The universal joint bearing according to claim 4, wherein the one of the any one of the group of: three sealing lips, four sealing lips, and five sealing lips abut against the trunnion.

6. The universal joint bearing according to claim 1, wherein the sealing ring is at least force-fitly fixed to the trunnion or the cup.

7. A universal joint bearing arrangement, consisting of the universal joint bearing according to claim 1, wherein a gap between the cup and the trunnion is sealed by only one sealing ring.

8. A universal joint connected to a propeller shaft of a motor driven apparatus, comprising a universal joint bearing according to claim 1.

9. A universal joint according to claim 8, wherein a gap between the cup and the trunnion is sealed by only one sealing ring, and wherein the trunnion is part of a crosspiece of the universal joint.

10. A truck comprising a universal joint according to claim 8.

11. The universal joint bearing according to claim 1, wherein a second axially extending portion of the at least one metal ring is located on and connected to an axially extending radial surface of the elastomeric ring, when viewed in cross section, the second axially extending portion is linearly aligned with the first axially extending portion.

12. The universal joint bearing according to claim 1, wherein a radially extending portion of the at least one metal ring is located on and connected to an outer radially extending axial surface of the elastomeric ring.

13. The universal joint bearing according to claim 1, wherein the at least one metal ring comprises a shield portion which adjoins a radially extending portion.

14. A universal joint bearing comprising:
a cup that serves as an outer ring of the universal joint bearing,
exactly one sealing ring, which is provided for sealing a gap between the cup and a trunnion, the sealing ring comprising a reinforcement ring and an elastomeric ring which prevents the reinforcement ring from abutting the outer ring,
at least one metal ring,
wherein the at least one metal ring comprises an axially extending portion and a shield portion,
wherein the shield portion is angled with respect to an axial direction of the universal joint bearing and with respect to a radial direction of the universal joint bearing, the axially extending portion of the at least one metal ring lays over, is located adjacently to, and connects to an axially extending radial surface of the outer ring, which faces radially outwardly therefrom, such that the at least one metal ring is not interposed between any portion of the sealing ring and the outer ring.

15. The universal joint bearing according to claim 14, wherein the elastomeric ring comprises at least one sealing lip that extends in a radial direction with respect to the trunnion and/or the cup.

16. The universal joint bearing according to claim 14, wherein the elastomeric ring comprises in total any one of the group of: three sealing lips, four sealing lips, and five sealing lips.

17. The universal joint bearing according to claim 16, wherein the one of the any one of the group of: three sealing lips, four sealing lips, and five sealing lips abut against the trunnion.

18. The universal joint bearing according to claim 14, wherein the sealing ring is at least force-fitly fixed to the trunnion or the cup.

19. A universal joint connected to a propeller shaft of a motor driven apparatus, comprising a universal joint bearing according to claim 14.

20. A universal joint bearing comprising:
a cup that serves as an outer ring of the universal joint bearing,
exactly one sealing ring, which is provided for sealing a gap between the cup and a trunnion,
at least one metal ring having a first axially extending portion,
wherein the sealing ring comprises a reinforcement ring and an elastomeric ring, the elastomeric ring being configured to prevent the reinforcement ring from abutting the outer ring, the axially extending portion of the at least one metal ring lays over, is located adjacently to, and connects to an axially extending radial surface of the outer ring, which faces radially outwardly therefrom, such that the at least one metal ring is not interposed between any portion of the elastomeric ring and the at least one outer ring.

* * * * *